(12) United States Patent
Cibie

(10) Patent No.: US 6,992,415 B2
(45) Date of Patent: Jan. 31, 2006

(54) GENERATOR FOR CHARGING A BATTERY OF A PORTABLE INSTRUMENT SUCH AS A PORTABLE TELEPHONE

(76) Inventor: Pierre Cibie, 145 Avenue du Roule, 92200 Neuilly sur Seine (FR)

( * ) Notice: Subject to any disclaimer, the term of this patent is extended or adjusted under 35 U.S.C. 154(b) by 73 days.

(21) Appl. No.: 10/436,065

(22) Filed: May 13, 2003

(65) Prior Publication Data

US 2004/0251754 A1 Dec. 16, 2004

(30) Foreign Application Priority Data

May 14, 2002 (FR) .................................. 02 05898

(51) Int. Cl.
*H02K 7/06* (2006.01)
(52) U.S. Cl. ....................................... 310/81
(58) Field of Classification Search ................ 310/81, 310/254, 261
See application file for complete search history.

(56) References Cited

U.S. PATENT DOCUMENTS 3,947,710 A * 3/1976 Miyamoto .................. 310/153
5,684,761 A   11/1997 Chen et al.
6,288,519 B1   9/2001 Peele

FOREIGN PATENT DOCUMENTS

| DE | 200 16 720 U1 | 11/2000 |
| JP | 56064676 A * | 6/1981 |
| WO | 84/01041 | 3/1984 |

* cited by examiner

*Primary Examiner*—Thanh Lam

(74) *Attorney, Agent, or Firm*—Young & Thompson

(57) ABSTRACT

A generator for charging the battery of a portable instrument such as a portable telephone, a player or the like, includes a permanent magnet in the form of a bar mounted freely in rotation about a pivotal axle corresponding to its median axis, within a magnetic circuit which is the core of a winding, the permanent magnet carrying a weight adjacent one of its ends, this assembly being mounted in the instrument such that, during movement of the portable instrument, the magnet unbalanced by the weight, pivots about its axle and relative to the magnetic circuit, which induces, in the winding, a current used to charge the battery of the instrument.

20 Claims, 1 Drawing Sheet

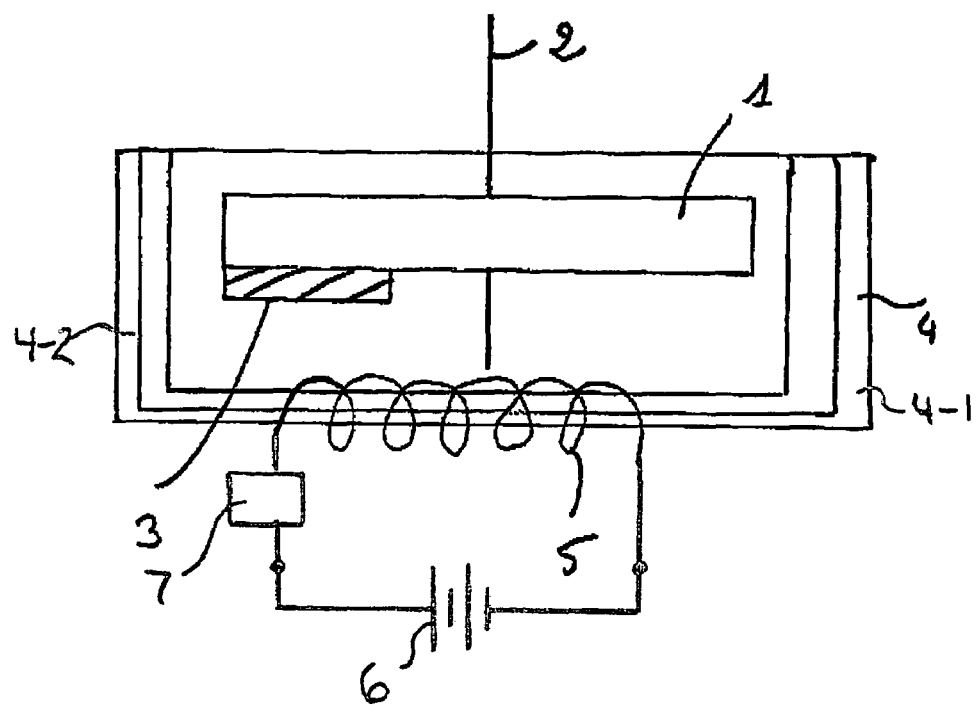

GENERATOR FOR CHARGING A BATTERY OF A PORTABLE INSTRUMENT SUCH AS A PORTABLE TELEPHONE

BACKGROUND OF INVENTION

The present invention relates to a generator for charging the battery of a portable instrument such as a portable telephone.

DESCRIPTION OF THE RELATED ART

Portable telephones have a major drawback in that their batteries must be regularly recharged. During charging of the battery, the telephone is most often unusable. Moreover, forgetting to charge the portable telephone frequently happens.

Furthermore, users of portable telephones do not always have with them the charger necessary for charging the battery when required.

This problem exists equally for all portable instruments such as players or compact disc players, portable radio receivers, etc.

SUMMARY OF THE INVENTION

So as to overcome this drawback, the present invention has for its object to provide a generator designed to be integrated into a portable instrument of the portable telephone type, player, etc. and which permits regularly charging the battery of said instrument.

To this end, the invention has for its object a generator for charging the battery of a portable instrument such as a portable telephone, a player or the like, characterized in that it is constituted by a permanent magnet in the form of a bar mounted freely rotatably about a pivotal axle corresponding to its median axis, within a magnetic circuit which is the core of a winding, the permanent magnet carrying a weight adjacent one of its ends, this assembly being mounted in the instrument such that, during movements to which the portable instrument is subjected, the magnet unbalanced by the weight pivots about its axle and relative to the magnetic circuit, which induces in the winding a current used to charge the battery of the instrument.

Thus preferably, when the user of the instrument provided with a generator according to the invention moves, it permits the charging of his battery, the generator using the random movements that take place during movement.

The magnetic circuit can be constituted by two half-circuits (4-1, 4-2) connected by the core of a winding. The two half-circuits are alternately north and south, the variation of flow inducing an alternating current.

The generator according to the invention can also have a structure similar to that of an alternator whose rotor is constituted by the magnet. The current is supplied by the stator and is then rectified by a diode bridge 7.

Preferably, the generator comprises moreover a rectifier, the current induced in the winding, of an alternating nature, being thus preferably rectified to provide to the battery current of a continuous nature.

According to a preferred embodiment, the generator is inserted in the instrument such that the pivotal axis of the permanent magnet is parallel to the longitudinal axis of the instrument.

The invention also has for its object a portable instrument such as a telephone, player or the like, characterized in that it comprises a generator as described above.

BRIEF DESCRIPTION OF THE DRAWINGS

The invention will now be described in greater detail with reference to the drawing, in which the single FIGURE shows schematically a generator according to the invention.

DESCRIPTION OF THE PREFERRED EMBODIMENTS

The generator according to the invention comprises a permanent magnet 1 in the form of a bar mounted pivotally about an axle 2 corresponding to its median axis.

This permanent magnet 1 carries a weight 3 mounted adjacent an end of said magnet 1.

The permanent magnet 1 is mounted within a magnetic circuit 4 constituting the core of a winding 5. The axis about which the magnet pivots intersects the axis of the winding 5.

When the generator is mounted in a portable telephone, the user of said telephone moves about. Under the influence of random movements connected with his moving about, the weight 3 unbalances the magnet 1 which pivots about the axle 2. The pivoting of the permanent magnet 1 induces a current in the winding 5.

This current is used to charge the battery 6 of the telephone in which the generator is inserted. This current, of an alternating nature, is preferably rectified by a diode bridge, for example, to supply the battery with a current of continuous nature.

What is claimed is:

1. Generator for charging the battery of a portable instrument comprising:
    a permanent magnet (1) in the form of a bar mounted freely rotatably about a pivotal axle (2) corresponding to its median axis, within a magnetic circuit (4) which is the core of a winding (5), the permanent magnet (1) carrying a weight (3) adjacent one of its ends, this assembly being mounted in the instrument such that, during movements to which said portable instrument is subjected, the magnet (1) unbalanced by the weight (3) pivots about its axle (2) and relative to the magnetic circuit (4), which induces, in the winding (5), a current used to charge the battery of the instrument.

2. Generator according to claim 1, characterized in that the magnetic circuit is constituted by two half-circuits connected by the core of a winding, the two half-circuits being alternately north and south, the variation of flow inducing an alternating current.

3. Generator according to claim 1, characterized in that the generator has a structure of an alternator, the rotor being constituted by the magnet, the current being provided by the stator.

4. Generator according to claim 1, characterized in that it comprises a rectifier, the current induced in the winding, of an alternating nature, being thus rectified to provide to the battery a current of continuous nature.

5. Generator according to claim 4, characterized in that the rectifier is constituted by a diode bridge.

6. Generator according to claim 1, characterized in that the generator is inserted in the instrument such that the pivotal axle (2) of the permanent magnet (1) is parallel to the longitudinal axis of the instrument.

7. A portable battery-powered device with a rechargeable battery and the charging generator according to claim 1.

8. The portable device of claim 7, wherein the portable device is one of a telephone and a player.

9. Battery generator of a portable instrument, comprising:
    an axle (2);

a permanent bar magnet (1) having a median axis, the magnet mounted pivotally about the axle at a position corresponding to the median axis so that the magnet pivots about the median axis;

a weight (3) carried by the magnet and offset mounted adjacent an end of the magnet;

a magnetic circuit (4), the magnet mounted within the magnetic circuit; and a winding (5) with a winding axis, the winding mounted around the magnetic circuit so that the magnetic circuit is a core of the winding, the median axis about which the magnet pivots intersecting the winding axis of the winding, wherein, under influence of random movements, the weight unbalances the magnet causing the magnet to pivot about the axle, the pivoting of the permanent magnet about the axle induces a current in the winding for charging a portable device battery.

10. The battery generator of claim 9, further comprising a telephone battery connected to the winding, wherein the induced current charges the telephone battery.

11. The battery generator of claim 9, further comprising a player battery connected to the winding, wherein the induced current charges the player battery.

12. The battery generator of claim 9, further comprising a music player battery connected to the winding, wherein the induced current charges the music player battery.

13. The battery generator of claim 9, wherein, the generator is inserted in an instrument with the axle (2) parallel to a longitudinal axis of the instrument.

14. Battery generator of a portable instrument, comprising:

a pivot axle (2);

a permanent bar magnet (1) having a median axis and a North pole at a first end and a South pole at a second end, the magnet mounted pivotally about the pivot axle at a position corresponding to the median axis so that the magnet pivots about the median axis;

a weight (3) carried by the magnet adjacent an end of the magnet;

a U-shaped magnetic circuit (4), the magnet mounted within the magnetic circuit; and a winding (5) with a winding axis, the winding mounted around the magnetic circuit with the magnetic circuit as a core of the winding, wherein, under influence of random movements, the weight unbalances the magnet causing the magnet to pivot about the pivot axle, and the pivoting of the permanent magnet about the pivot axle varies an air-gap between the magnet and the magnetic circuit to induce an alternating current in the winding for charging a portable device battery.

15. The battery generator of claim 14, further comprising a telephone battery connected to the winding, wherein the induced current charges the telephone battery.

16. The battery generator of claim 14, further comprising a player battery connected to the winding, wherein the induced current charges the player battery.

17. The battery generator of claim 14, further comprising a music player battery connected to the winding, wherein the induced current charges the music player battery.

18. The battery generator of claim 14, wherein, the generator is inserted in an instrument with the axle (2) parallel to a longitudinal axis of the instrument.

19. The battery generator of claim 9, wherein, the median axis about which the magnet pivots intersecting the winding axis of the winding.

20. The battery generator of claim 14, wherein, the median axis about which the magnet pivots intersecting the winding axis of the winding.

\* \* \* \* \*